No. 11,999. Reissued June 10, 1902.

J. BURGUM.

STEAM TURBINE.

(Application filed Dec. 26, 1901.)

4 Sheets—Sheet 1.

Witnesses { C. D. Kesler. A. B. Kesler

Inventor John Burgum

By James L. Norris Atty

No. 11,999.
Reissued June 10, 1902.
J. BURGUM.
STEAM TURBINE.
(Application filed Dec. 26, 1901.)
4 Sheets—Sheet 2.
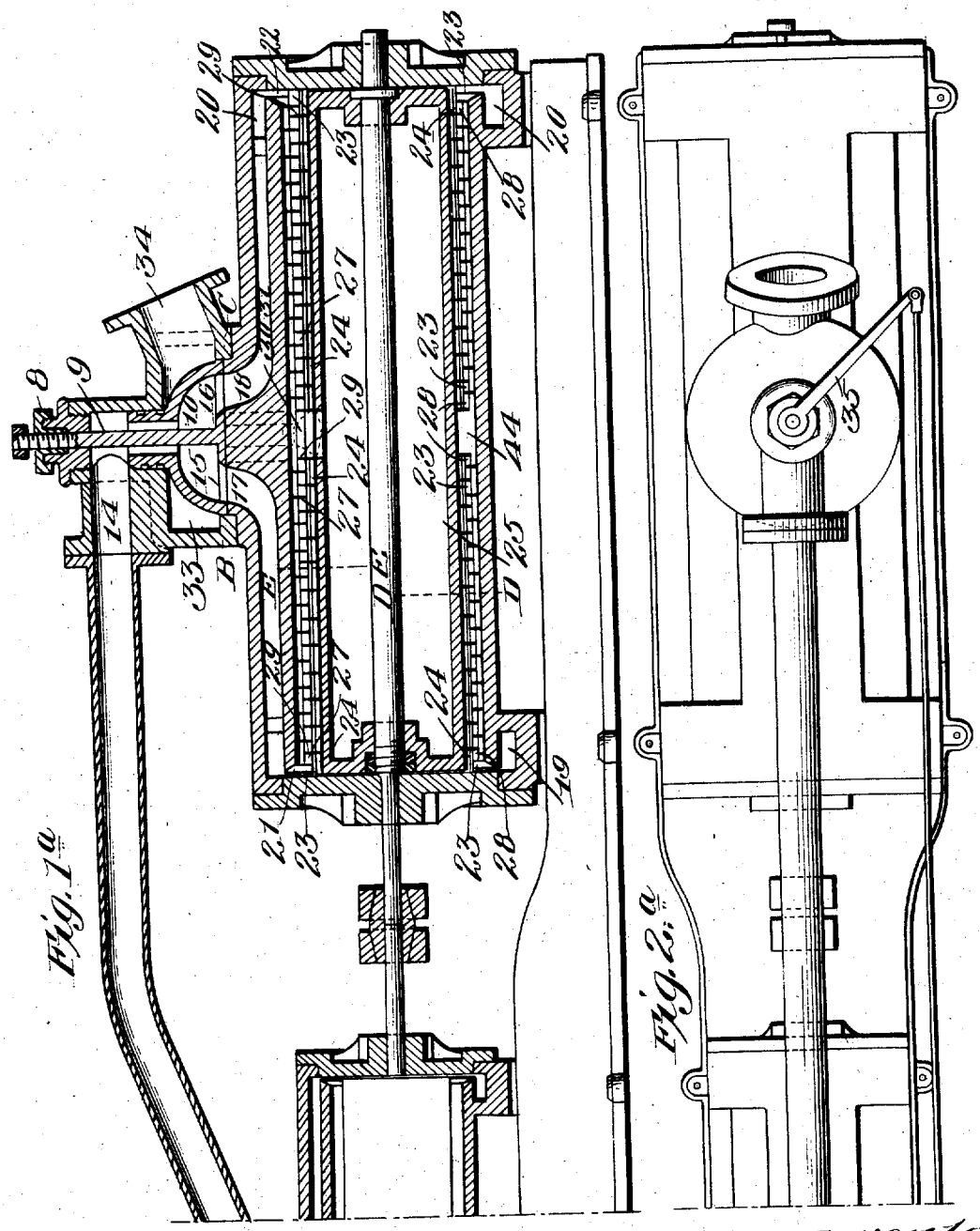
Witnesses
C. L. Kesler
J. B. Keefe
Inventor
John Burgum
By James L. Norris
Atty No. 11,999. Reissued June 10, 1902.

J. BURGUM.

STEAM TURBINE.

(Application filed Dec. 26, 1901.)

4 Sheets—Sheet 3.

Witnesses:
C. D. Kesler
J. B. Kesler

Inventor
John Burgum
By James L. Norris
Atty

No. 11,999.

Reissued June 10, 1902.

J. BURGUM.

STEAM TURBINE.

(Application filed Dec. 26, 1901.)

4 Sheets—Sheet 4.

Witnesses

C. L. Kesler.

J. B. Keefe

Inventor

John Burgum

By James L. Norris

Atty

UNITED STATES PATENT OFFICE.

JOHN BURGUM, OF RIO JANEIRO, BRAZIL.

STEAM-TURBINE.

SPECIFICATION forming part of Reissued Letters Patent No. 11,999, dated June 10, 1902.

Original No. 641,074, dated January 9, 1900. Application for reissue filed December 26, 1901. Serial No. 87,239.

*To all whom it may concern:*

Be it known that I, JOHN BURGUM, a subject of the King of Great Britain, residing at 43 Rua do Rozario, in the city of Rio de Janeiro, Brazil, have invented certain new and useful Improvements in Steam-Turbines, of which the following is a specification.

My invention relates to a reversible steam-turbine of the circumferential-flow type, in which the steam actuates either direction in the same conditions and power.

Figure 1:
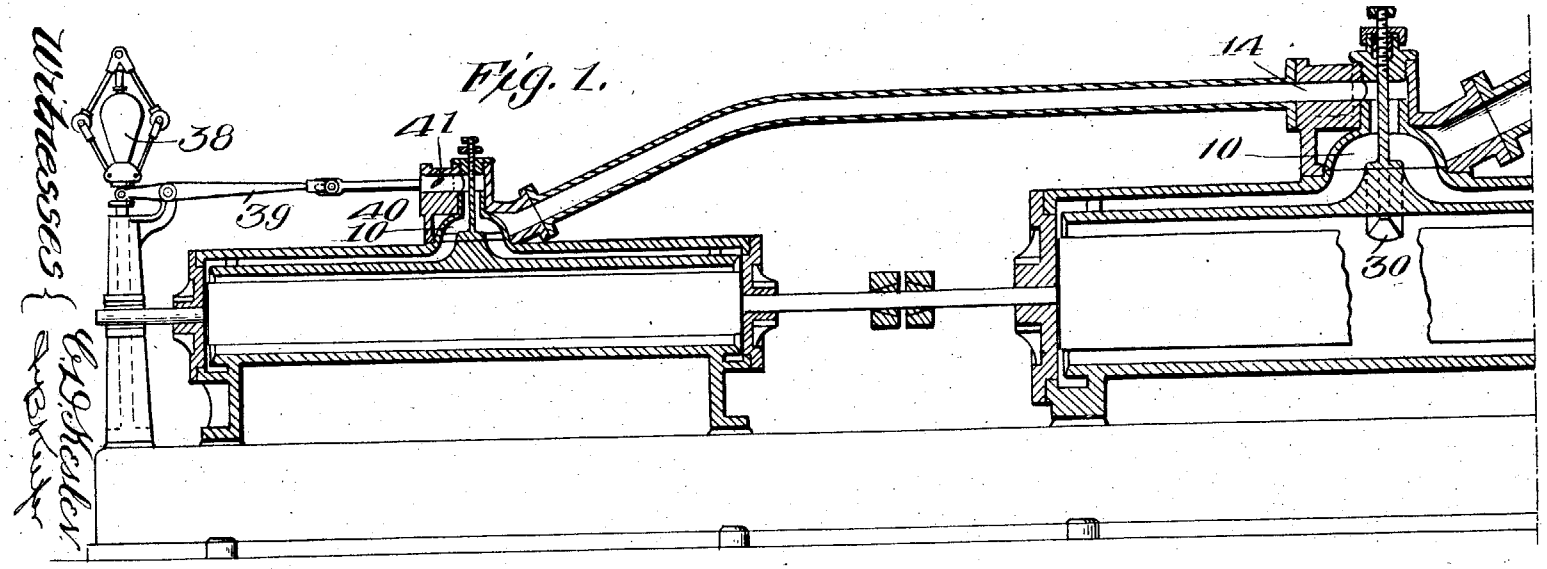
Figure 2:
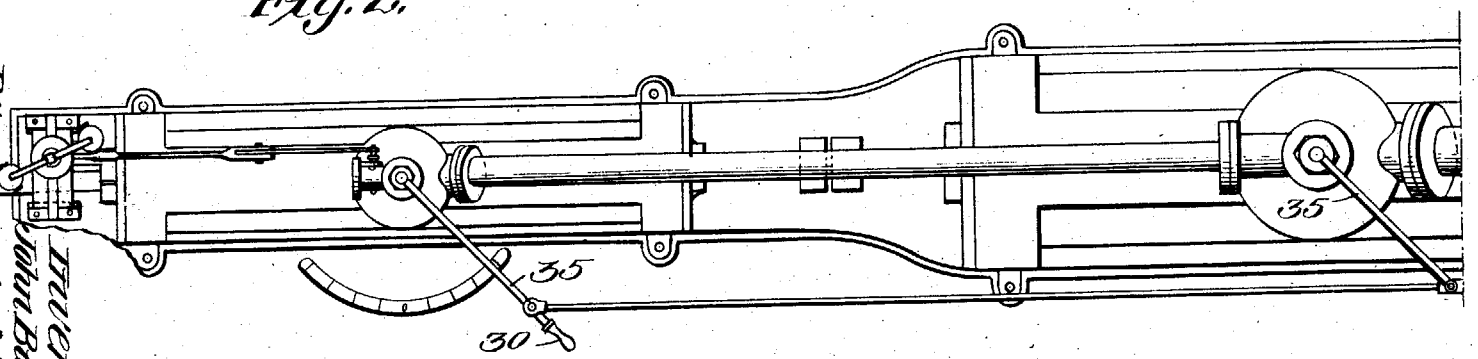
Figure 3:
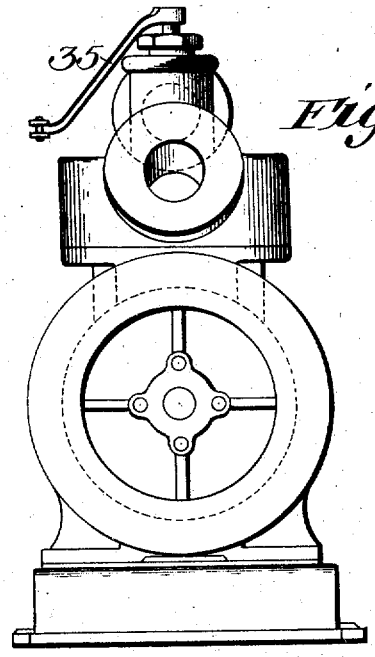
Figure 13:
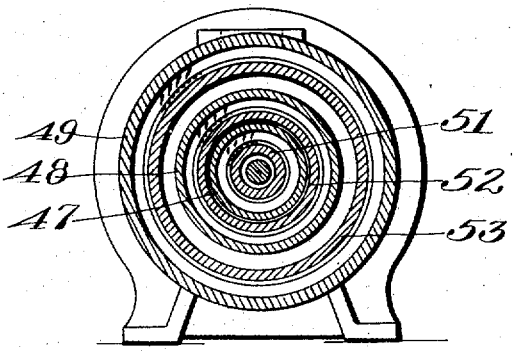
Figure 4:
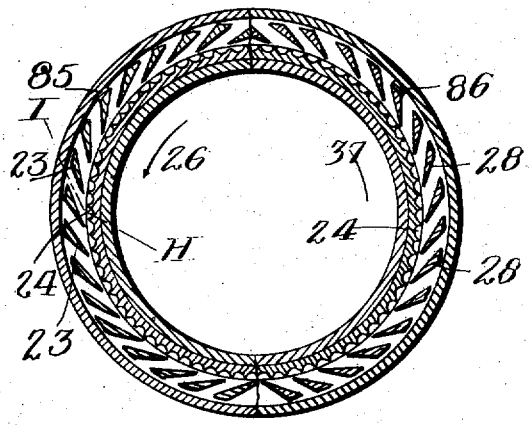
Figure 5:
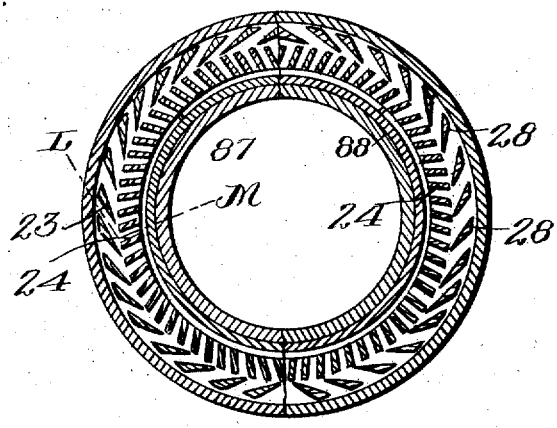
Figure 6:
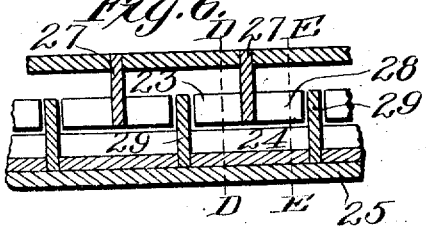
Figure 7:
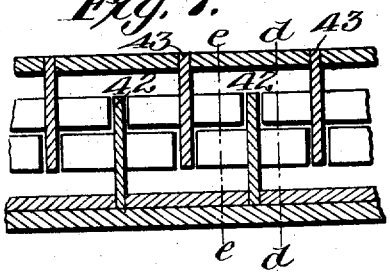
Figure 8:
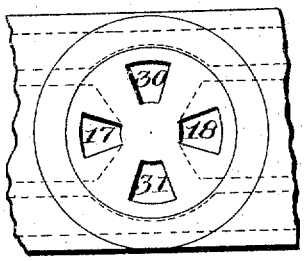
Figure 10:
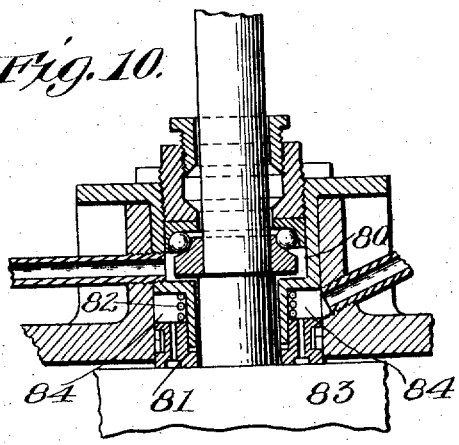
Figure 9:
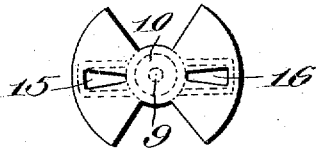
Figure 11:
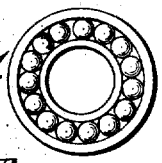
Figure 12:
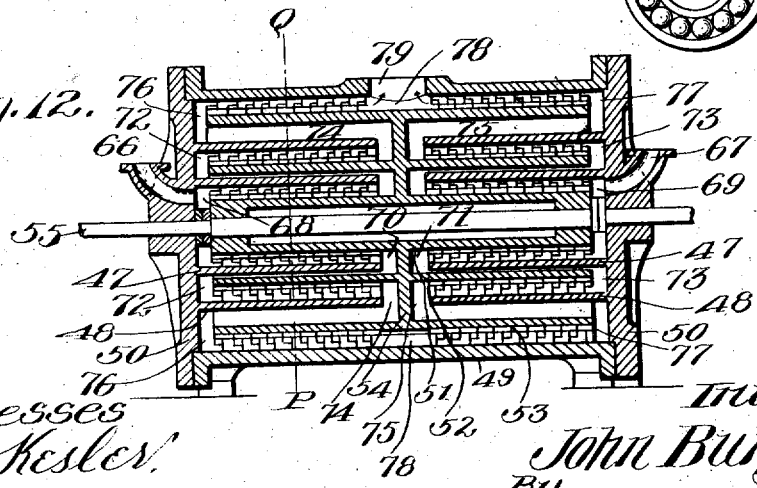

The drawings annexed show the views as follows:

Figure 1 is a longitudinal section through the center of a set of three turbine-cylinders. Fig. 1ª is a similar section showing the furrows or blades upon the revolving drum, said figure being upon a somewhat large scale and showing the whole of the central cylinder and a portion only of the high-pressure cylinder. Fig. 2 is a plan of Fig. 1. Fig. 2ª is a plan view of the parts shown in Fig. 1ª. Fig. 3 shows end elevation of Figs. 1 and 2. Fig. 4 is an enlarged section across the lines E E and D D in Fig. 1ª. Fig. 5 is a similar view showing another kind of blades on the revolving drum. Figs. 6 and 7 are respectively enlarged partial section views across broken lines I H in Fig. 4 and L M in Fig. 5, showing fixed partition-rings with blades on each side and the revolving partition-rings fixed to drum. Fig. 8 shows the steam-ports in cylinder. Fig. 9 shows the reversing-valve, with a shaft extending through a packed stuffing-box. Figs. 10 and 11 show the ball-bearings. Fig. 12 shows the three compound turbine-cylinders telescoped in one another. Fig. 13 shows a cross-section through the line P Q in Fig. 12.

Each turbine-cylinder is constructed with a fixed cylinder having a revolving drum internally fixed onto the motor-shaft. The cylinder has four ports, one communicating to each annular chamber at each end of cylinder, and also two ports communicating to the center of cylinder between the length. A reversing-valve covers two of these ports, admitting the steam either to the two ends of cylinder and exhausting out at the center of cylinder or admitting steam to the center of cylinder and exhausting out at the two ends of cylinder when reversing. Each end of cylinder is closed by a cover while the motor-shaft passes through its center. The cylinders contain a number of fixed rings or directing-blades each side of a partition, as shown by drawing Fig. 4, in which one of the blades 85 or 86 extends in each section to keep the steam from circulating around the circumference. The revolving drum 25 has partitions with furrows or blades 24, as shown by Figs. 4 and 5, which correspond with those fixed to cylinder, Fig. 5.

The steam after doing its work in the high-pressure cylinder, which is shown at the left hand in Figs. 1, 1ª, 2, and 2ª, is admitted at 14 to the cylinder 44, passing through the center of reversing-valve 10 to the ports 15 and 16 in valve 10 in the position of valve as shown. These ports are in communication with the ports 17 and 18, which lead, respectively, to the annular chambers 19 and 20. The steam now passes through a narrow space 21 and 22 around the end of the cylinder and flows through the first section of fixed directing-blades 23, directing the steam, which now impinges onto the furrows or blades 24, on the revolving drum 25, giving motion in the direction of the arrow 26 shown in Fig. 4. The steam now passes through the partition 27 along the furrow 24, striking the partition 29, fixed to the revolving drum. Its course is now changed, and it impinges onto the fixed directing-blades 28, which rebounds a portion of its force onto the furrows or blades 24 in the direction of the arrow 26. The steam is now about to repeat the same as above described, alternately passing the fixed and revolving partitions, impinging onto the furrow or blades until it arrives at the center of cylinder, which has a space between the blade-rings forming an annular chamber 44 between the cylinder and the drum. It now passes through the cylinder-ports 30 and 31, passing to the valve-chamber 33 to the outlet through the exhaust-pipe 34. In this form the steam flows through each turbine-cylinder from one to the other until the steam-pressure is reduced down to the atmospheric pressure and then discharged to a condenser. To reverse, the lever 35 is pulled over to the opposite side by the hand-lever 36, as shown in plan Fig. 2. The ports 15 16 in the reversing-valve 10 are now brought in communication with the ports in center of cylinder-ports 30 and 31. The ports 17 and 18, which had before admitted the steam to the ends of cylinder, are now open to the exhaust-chamber 33. The steam now being admitted to the center annular chamber 44 of cylinder, flows toward both ends of cylinder first through the fixed section of directing-blades 28 in Fig. 4, impinging onto the furrows or blades 24 on the revolving drum 25, giving motion in the direction as arrow 37. The steam is now flowing toward the axis. It now passes through the partition 27 along the furrow or blade 24, striking the revolving partition 29, fixed to the drum 25. Its course is now changed, being from the axis. The steam now impinges onto the fixed directing-blades 23, which rebounds a portion of its force onto the furrows or blades 24 in the same direction as arrow 37. The steam now repeats the same alternately until it reaches the ends of cylinder, where it passes into the annular chambers 19 and 20, through the ports 17 and 18, into the valve-chamber 33, and out through the exhaust-pipe 34.

Fig. 12 shows the three turbine-cylinders telescoped into one, obtaining the same effective power in the same space as the low-pressure cylinder. This form of turbine is suitable for land purposes where not required to be reversed. 47 is the fixed high-pressure cylinder. 48 is the fixed intermediate-pressure cylinder. 49 is the low-pressure cylinder. 47 and 48 are fixed to the cylinder-covers. 50 51 52 53 are the high-pressure, intermediate, and low-pressure revolving cylinders fixed to a division-plate 54. The motor-shaft 55 is secured in the center and passes through the cylinder-covers 50. The shaft runs on ball-bearings, as shown by Figs. 10 and 11.

Fig. 13 is a cross-section through the line-letters P Q, showing the fixed cylinders 47 48 49, which carry the fixed directing-blades, and the revolving cylinders 51 52 53, which carry the revolving blades. (Same as shown in Figs. 4 or 5.) The blades 28 in Figs. 4 and 5 are omitted in this form of turbine.

The steam is first admitted into the supply-pipes 66 and 67 both at the same time and then into the annular chambers 68 and 69. The steam now flows to the axes through the first rings of fixed directing-blades on the fixed cylinder 47, impinging onto the furrows or blades 24, which are fixed to the revolving drum 51, giving motion in the direction as arrow 26. The steam now flows from the axes between the fixed partitions and the partitions 29 on the revolving drum, which partitions will be the same as shown by Fig. 6. The blades 28 are omitted. The steam is now about to repeat the same through the next ring of fixed directing-blades, flowing to the axes, impinging onto the furrows or blades which are fixed to the revolving cylinder, then flowing from the axes to be directed again, and so on, until the steam has passed through the series of blade-rings and arrives at the annular chambers 70 and 71. Here the steam returns back to the cylinder-covers between the fixed cylinders 47 and the revolving cylinders 52 to the annular chambers 72 and 73. The steam now flows through these sets of blades the same as aforedescribed. The cylinder being larger in diameter, the steam expands to a lower pressure. Arriving at the annular chambers 74 and 75 it returns back to the cylinder-covers between the fixed cylinder 48 and the revolving cylinder 53 to the annular chambers 76 and 77. The steam now flows through these sets of fixed and revolving blades the same as aforedescribed. This cylinder being larger than the former, the steam here expands to a lower pressure still, and when arriving at the annular chamber 78 the steam is reduced to the atmospheric pressure, where it exhausts out through the outlet-pipe 79 to a condenser or to the atmosphere.

38, Fig. 1, is an ordinary governor, worked by a worm on the motor-shaft. The lever 39 is oscillated by the governor 38, which actuates the lever 40, being connected to the throttle-valve 41, cuts off the steam-supply as required to maintain a uniform speed. Across the lines *d d e e*, Fig. 7, the partition-rings 43, which are fixed to the cylinder, extend between the revolving blades on the drum, and the partition-rings 42, which revolve with the drum, extend between the fixed blades in cylinder. The steam flows through these forms of blades the same as aforedescribed.

I employ ball-bearings, as shown by Figs. 10 and 11, for the shaft to run on. The ball-chamber 80 is filled with oil, allowing the balls to run in the lubricant. These bearings have the dead-weight of the shaft and the revolving drum to contend with only, as the thrust onto the end of drum is perfectly balanced. A ring 81 is placed at the inner side of ball-casing. This ring has springs to keep the steam from passing through the cylinder-covers. A spiral spring 82 forces this ring against the revolving drum 83. Between this ring and the ball-casing there is an oil-chamber 84, which lubricates the face of drum 83 through small holes in the ring 81. By these means no steam is allowed to escape through the bearings. Each cylinder-cover is fitted with these bearings.

Steam-turbines constructed in accordance with my invention as illustrated in Figs. 1 to 3, inclusive, will run in either direction under the same conditions and with the same power. It can be operated also by steam, air, water, or any suitable fluid.

On reference to the drawings it will be seen that my improved steam-turbine includes an external fixed cylinder and an internal revolving drum having their interior and exterior surfaces provided with a series of longitudinal steam-directing blades and a series of transverse steam-directing partitions intersecting said blades, the blades and partitions terminating centrally between the ends of the cylinder and drum to provide a central annular steam-chamber, and the edges of said partitions being substantially in line with the outer edges of the blades.

Having thus particularly described my invention and the manner of working same, I claim as follows:

1. The combination, in a steam-turbine, of an external fixed cylinder and an internal revolving drum, having their interior and exterior surfaces provided with a series of longitudinal steam-directing blades, and a series of transverse steam-directing partitions intersecting said blades; the blades and partitions terminating centrally between the ends of the cylinder and drum to provide a central annular steam-chamber and the outer edges of said partitions being substantially in line with the outer edges of the blades.

2. The combination, in a steam-turbine, of a fixed cylinder having attached steam-directing blades 23 and partitions 27 on its interior, a revolving drum arranged within said cylinder and having attached steam-directing blades 24 and partitions 29 on its exterior coacting with those on the interior of the fixed cylinder, and steam-ports and a steam-reversing valve arranged centrally between the ends of said cylinder and drum and governing all of said ports, to admit steam at the center and exhaust from the opposite ends of the cylinder and drum, or to admit steam at the opposite ends of said cylinder and drum and exhaust from the center thereof, substantially as described.

3. The combination, in a steam-turbine, of a fixed cylinder having an annular steam-chamber centrally between its ends, and a plurality of steam-directing blades and partitions on its interior from the annular steam-chamber to its opposite ends, a revolving drum arranged within the fixed cylinder and having a plurality of steam-directing blades and partitions on its exterior from said annular steam-chamber to its opposite ends, the steam-ports leading from the center of the cylinder to its opposite ends and to said annular steam-chamber, and a steam-reversing valve controlling said ports to admit steam direct to the central annular steam-chamber and exhaust from opposite ends of the cylinder and drum or to admit steam to the opposite ends of the cylinder and drum and exhaust from the central annular steam-chamber, substantially as described.

4. The combination, in a steam-turbine, of a fixed cylinder having a set of steam-ports and an annular steam-chamber centrally between its ends, a longitudinal, rotary motor-shaft, a rotary drum arranged on said shaft within the fixed cylinder, and an oscillatory reversing-valve controlling the set of steam-ports at the center of the cylinder and serving to admit steam direct to said central annular steam-chamber and exhaust from opposite ends of the cylinder and drum, or to admit steam to the opposite ends of the cylinder and drum and exhaust from the central annular steam-chamber, substantially as described.

5. The combination, in a steam-turbine, of an external fixed cylinder and an internal revolving drum having their interior and exterior surfaces provided with a series of longitudinal steam-directing blades, and a series of transverse steam-directing partitions intersecting said blades; the blades and partitions terminating centrally between the ends of the cylinder and drum to provide a central, annular steam-chamber, with a steam-inlet and steam-valve in the cylinder opposite to, or in coincidence with, said central, annular steam-chamber, substantially as described.

In testimony whereof I have hereunto set my hand in presence of two subscribing witnesses.

JOHN BURGUM.

Witnesses:
JULES GÉRAUD,
G. F. BUTCHER.